United States Patent [19]

Straitz, III

[11] 4,128,734

[45] Dec. 5, 1978

[54] THERMOCOUPLE AND MOUNTING THEREFOR

[75] Inventor: John F. Straitz, III, Elkins Park, Pa.

[73] Assignee: Combustion Unlimited Incorporated, Elkins Park, Pa.

[21] Appl. No.: 854,050

[22] Filed: Nov. 22, 1977

[51] Int. Cl.² .................. H01L 35/02; H01L 35/28
[52] U.S. Cl. ............................... 136/232; 136/217; 136/219
[58] Field of Search ............... 136/217, 219, 232, 234

[56] References Cited

U.S. PATENT DOCUMENTS

| 2,267,742 | 12/1941 | Mantz | 136/219 |
| 2,363,072 | 11/1944 | Mantz | 136/219 |
| 2,676,195 | 4/1954 | Hart | 136/232 X |

Primary Examiner—Leland A. Sebastian
Attorney, Agent, or Firm—Zachary T. Wobensmith, 2nd; Zachary T. Wobensmith, III

[57] ABSTRACT

A thermocouple is disclosed carried by and enclosed within a tubular holder which protects the thermocouple wires but provides for limited exposure of the thermocouple tip through an opening in the tube and preferably with a back-up reflector plate.

7 Claims, 4 Drawing Figures

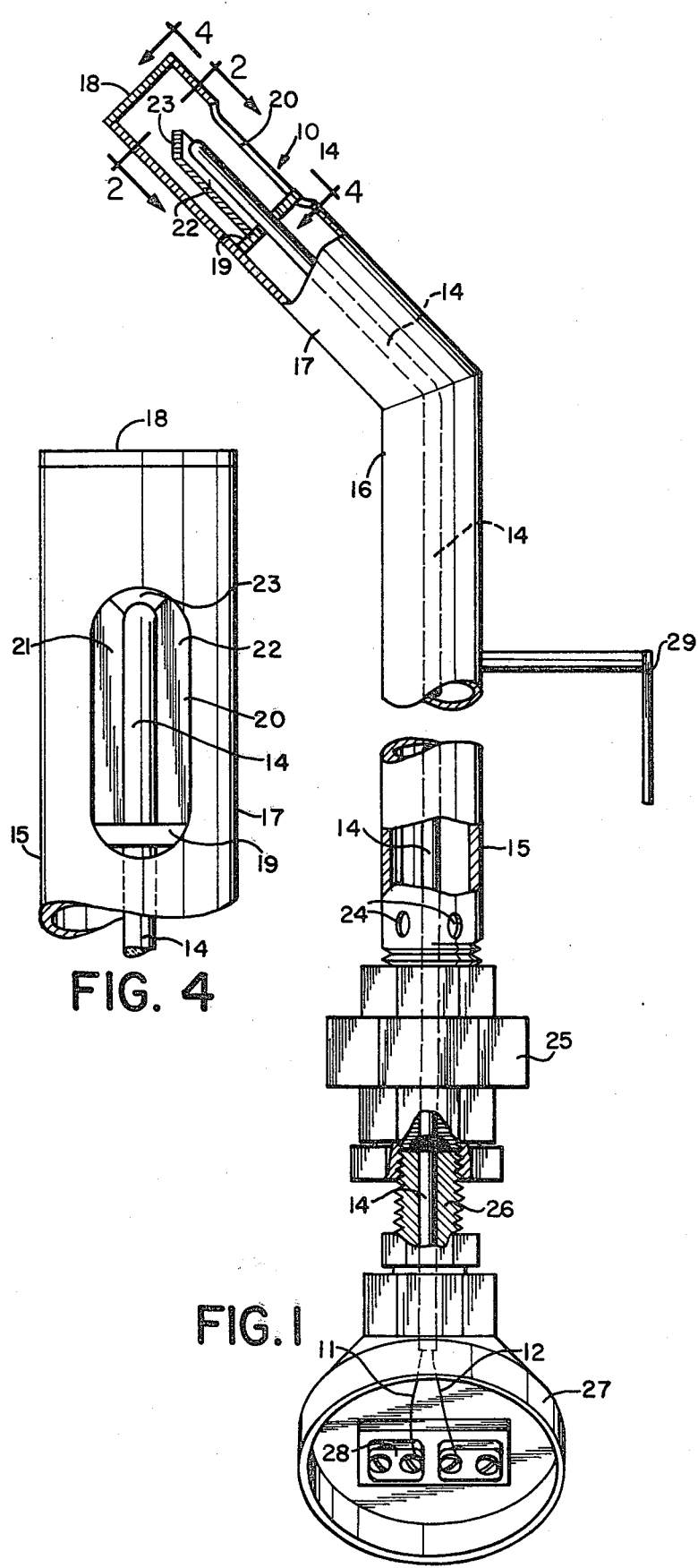

THERMOCOUPLE AND MOUNTING THEREFOR

BACKGROUND OF THE INVENTION

1. Field of the Invention

This invention relates to thermocouples and mountings therefor and more particularly to a thermocouple which is employed in a location which is exposed to the elements and in which the combustion is out of doors.

2. Description of the Prior Art

Thermocouples for measuring the temperature at a location exposed to heat are well known and have been supported in various ways including pipes with the junction of the wires of dissimilar metals exposed at the end of the pipe.

No wholly satisfactory provisions have heretofore been made to mount a thermocouple in a location where the temperature responsive junction is exposed not only to combustion but also to sun, wind and rain.

SUMMARY OF THE INVENTION

In accordance with the invention a thermocouple is provided carried by and enclosed within a tubular holder, the holder preferably having an upper section angularly disposed with respect to a lower section, the lower section having drain openings, the holder being closed at the top end and having therebelow a vertically elongated slot. The thermocouple wires, in an enclosing and insulating sheath being guided at the top in a transverse wall spaced from the top end wall, the upper transverse wall having a back-up plate at the end of the thermocouple wires. The lower end of the lower section is preferably carried by a junction box for electrical connection to utilize the signal from the thermocouple terminal.

It is the principal object of the invention to provide a thermocouple and supporting mounting therefor in which the thermocouple will be reliable in its action under adverse conditions of weather and which will withstand the effects of out of doors exposure and the temperatures to which the structure is exposed.

It is a further object of the invention to provide a thermocouple and mounting therefor which is particularly suited for use at the top of a waste gas flare stack for burning of combustible waste gases from refineries and other manufacturing plants.

It is a further object of the invention to provide a thermocouple and mounting therefor in which the thermocouple is rapid in its action, shielded from the wind and protected from direct flame impingement which could be destructive.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a view partly in elevation and partly in section of a thermocouple and mounting therefor in accordance with the invention;

FIG. 2 is a transverse sectional view, enlarged, taken approximately on the line 2—2 of FIG. 1;

FIG. 3 is an enlarged fragmentary vertical sectional view of the upper end of the thermocouple; and FIG. 4 is a fragmentary view in elevation of the upper end of the structure and illustrating the window opening.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, in which a preferred embodiment of the invention is illustrated, the thermocouple 10 has thermocouple wires 11 and 12, of dissimilar metals, joined at a bead 13. A sheath 14 of temperature resistant material is provided within which the wires 11 and 12 are enclosed. The sheath 14 can be of high chrome nickel alloy material with a high non-electrically conductive filling 14a, the bead 13 being spaced from the end of the sheath 14 close to its end.

A mounting tube 15 is provided for the thermocouple and in a specific embodiment can be a high chrome nickel alloy pipe of a diameter of one inch. The mounting tube 15 has a lower section 16 and an upper section 17 disposed at an angle to the lower section 16. The angle will be varied, determined by the requirements of a particular installation, but will normally be in the range from 15° to 45° to locate the thermocouple a short distance from the flame to insure a good viewing angle while avoiding excessive heating.

The upper section 17 is closed at the top by an end plate 18 and, spaced therebelow a transverse wall 19 is secured in place in the upper section 17. The upper section 17 is provided with a viewing slot or window opening 20 which for the size of mounting pipe 15 referred to can be of a height of about two and one half inches and of a width of about one-half inch. The end of the sheath 14 of the thermocouple 10 is exposed to radiant heat entering through the opening or slot 20.

The upper end of the sheath 14 extends through an opening 19a and is guided by the transverse wall 19.

A back-up is provided for the exposed end of the thermocouple 10, carried by the transverse wall 19 and has side wall portions 21 and 22, V-shaped in transverse cross section with an inclined end wall portion 23. The wall portions 21, 22 and 23 partially enclose the thermocouple sheath 14 at the sides and at its outer end and reflect radiant heat effective through the opening or slot 20 into the thermocouple sheath 14.

The mounting tube 15, contiguous to the lower end of the lower section 16, has a plurality of drain holes 24 for discharge of any water, such as rain, which may enter the tube 15 at the opening 20.

The lower end of the lower section 16 of the tube 15 has a coupling 25 in engagement therewith which is in engagement with a junction box 27, of well known type, into which the wires extend into engagement with a connection block 28.

One or more brackets 29 can be provided for mounting the tube 15 at the desired location on a flare stack or the like.

When the thermocouple is mounted at the desired location radiant heat effective from a nearby flame through the slot or opening 20 activates the thermocouple 10 to give a signal indicative of the temperature of the flame. This signal can be made effective in any desired manner for indication or control purposes.

I claim:

1. In combination
   a thermocouple having a tubular enclosing sheath with a closed terminal end,
   said thermocouple having an end portion within said sheath for activation,
   a continuous elongated mounting tube in enclosing relation to said thermocouple and said sheath and having an end closure at its upper end and a transverse wall spaced from said end closure and through which said enclosing sheath of said thermocouple extends,
   said mounting tube between said end closure and said transverse wall having in a side portion thereof an opening through which radiant heat is effective on said end portion of said thermocouple.

2. The combination defined in claim 1 in which said tube has an upper portion and a lower portion, and
   said upper portion is angularly disposed with respect to said lower portion.

3. The combination defined in claim 1 in which the lower end of said tube has liquid drain openings for discharge of liquid from said tube.

4. The combination defined in claim 1 in which the lower end of said tube has a junction box connected thereto into which the wires of said thermocouple extend.

5. The combination defined in claim 2 in which said lower portion has a mounting bracket connected thereto for support of said tube.

6. The combination defined in claim 1 in which said thermocouple has opposite said opening a reflector shield in partial surrounding relation thereto.

7. The combination defined in claim 6 in which said shield comprises side wall portions disposed in transverse V-shaped relation and an end wall portion beyond the end portion of the thermocouple.

* * * * *